United States Patent
Xia et al.

(10) Patent No.: US 9,187,618 B2
(45) Date of Patent: Nov. 17, 2015

(54) BORON CARBIDE HIGH POLYMERIC FIBER

(71) Applicants: Huasong Xia, Jinhua (CN); Kangkai Xia, Jinhua (CN)

(72) Inventors: Huasong Xia, Jinhua (CN); Kangkai Xia, Jinhua (CN)

( * ) Notice: Subject to any disclaimer, the term of this patent is extended or adjusted under 35 U.S.C. 154(b) by 0 days.

(21) Appl. No.: 14/394,970

(22) PCT Filed: Feb. 7, 2013

(86) PCT No.: PCT/CN2013/071485
§ 371 (c)(1),
(2) Date: Oct. 16, 2014

(87) PCT Pub. No.: WO2013/155891
PCT Pub. Date: Oct. 24, 2013

(65) Prior Publication Data
US 2015/0126649 A1  May 7, 2015

(30) Foreign Application Priority Data

Apr. 16, 2012 (CN) .......................... 2012 1 0108701

(51) Int. Cl.
| | |
|---|---|
| *C08K 5/00* | (2006.01) |
| *B32B 7/12* | (2006.01) |
| *B29C 47/88* | (2006.01) |
| *C08K 3/38* | (2006.01) |
| *C04B 35/622* | (2006.01) |
| *C04B 35/634* | (2006.01) |
| *C08K 5/18* | (2006.01) |
| *C08K 5/3437* | (2006.01) |
| *D01D 5/08* | (2006.01) |
| *G21F 1/10* | (2006.01) |
| *G21F 3/00* | (2006.01) |

(52) U.S. Cl.
CPC ............. *C08K 3/38* (2013.01); *C04B 35/62277* (2013.01); *C04B 35/63408* (2013.01); *C08K 5/18* (2013.01); *C08K 5/3437* (2013.01); *D01D 5/08* (2013.01); *G21F 1/10* (2013.01); *G21F 3/00* (2013.01); *C04B 2235/3821* (2013.01); *D10B 2101/14* (2013.01); *D10B 2321/021* (2013.01)

(58) Field of Classification Search
CPC ................. C04B 35/62277; C04B 2235/3821; C04B 35/63408; C08K 3/38; C08K 5/3437; C08K 5/18; G21F 3/00; G21F 1/00; D01D 5/08; D01B 210/14; D01B 2321/021
USPC ................................ 524/87, 186; 264/211.14
See application file for complete search history.

(56) References Cited

U.S. PATENT DOCUMENTS

| | | | |
|---|---|---|---|
| 4,732,701 A | 3/1988 | Nishii et al. | |
| 7,476,889 B2 * | 1/2009 | DeMeo et al. | 250/516.1 |

FOREIGN PATENT DOCUMENTS

| | | |
|---|---|---|
| CN | 101791859 | 8/2010 |
| KR | 10-2008-0107850 | 12/2008 |

OTHER PUBLICATIONS

International Search Report dated May 16, 2013 issued in corresponding International patent application No. PCT/CN2013/071485.

* cited by examiner

*Primary Examiner* — William Cheung
(74) *Attorney, Agent, or Firm* — Ostrolenk Faber LLP

(57) ABSTRACT

A novel material boron carbide high polymeric fiber fabricated from the following parts of raw materials by weight: 50-60 parts of boron carbide, 150-193 parts of high polymeric ethylene emulsion with a concentration 40%-50%, 116 parts of hydrochloric acid with a concentration 37%, 3-5 parts of antioxidant, and 7 parts of catalyst, and fabricated in a 2500-2800° C. high-temperature high-pressure furnace and then in a high temperature-resistant spinning furnace. The novel material boron carbide high polymeric fiber produced according to the present invention exhibits performances such as extremely good resistance against high temperature and low temperature, super anti-acid and anti-base performance, excellent extensibility, wear resistance and anti-impact capability, and resistance against ultraviolet and the like. The boron carbide high polymeric fiber may be used in fields such as firearms manufacture, maritime rescue, fire protection and fire fight, anti-bullet and anti-explosion armor, biochemical nuclear industry treatment, and may be extensively applied to civil field, aerospace, military fairs and national defense. The material is recyclable and pollution-free.

7 Claims, No Drawings

BORON CARBIDE HIGH POLYMERIC FIBER

CROSS REFERENCE TO RELATED APPLICATIONS

This application is a national stage application under 35 U.S.C. 371 of PCT Application No. PCT/CN2013/071485 filed Feb. 7, 2013, which claims the benefit of China Application No. 201210108701.8 filed Feb. 7, 2013, the entire disclosure of which is incorporated herein by reference.

FIELD OF THE INVENTION

The present invention relates to a high polymeric fiber.

BACKGROUND OF THE INVENTION

China is a big power but not a strong power in respect of chemical fiber. According to experts' introduction and statistics of component authorities, China's output of high-performance special fibers is only one percent of the world's output. Currently, three major high-performance fibers in the world are carbon fiber, aramid fiber and high molecular weight polymeric fiber. Carbon fiber is still in an experimental and initial production phase, and a product thereof can only be applied to a field such as wearable fillers. Over 70 percent of high molecular weight polymeric fiber in European and American developed countries is applied to military fields such as body armor, bullet-proof helmet, anti-bullet armor of military facilities and equipment, and aerospace. Development of high-performance fiber exhibits comprehensive power of a country, and high-performance fiber is an important material basis for building a modernized strong country. To this end, it is particularly urgent and desirable to expedite production and application of high-performance special fibers in China from the perspective of state interests.

SUMMARY OF THE INVENTION

An object of the present invention is to provide boron carbide high polymeric fiber as a novel dedicated material.

A new material boron carbide high polymeric fiber is inventive after long-term development and repeated experiments. The material is fabricated from the following raw materials: boron carbide, high polymeric ethylene emulsion, hydrochloric acid, antioxidant and catalyst.

The boron carbide high polymeric fiber according to the present invention may be used in fields such as firearms manufacture, maritime rescue, fire protection and fire fight, anti-bullet and anti-explosion armor, biochemical nuclear industry treatment, and may be extensively applied to civil field, aerospace, military fairs and national defense. The present invention exhibits performances such as extremely good resistance against high temperature and low temperature, super anti-acid and anti-base performance, excellent extensibility, wear resistance and anti-impact capability and the like, and may be used in a long period of time at a range of temperature −170 -2100° C. under a standard atmospheric pressure. The material has a super anti-acid and anti-base performance, and the material per se will not substantively change if it is immersed consecutive 30 days in caustic soda solution at a normal temperature and under a normal pressure or immersed consecutive 30 days in hydrochloric acid solution; the material has excellent performances such as extensibility, wear resistance, anti-impact capability and resistance against ultraviolet ray, and its fiber strength is over ten times that of steel wire with the same cross section. The fiber has a low density and can float on water; the material has a low breaking elongation and has a very strong energy-absorbing capability, and therefore has a prominent anti-impact capability. The material can resist against ultraviolet radiation and prevent neutron and γ rays; the material has a low dielectric constant and high electromagnetic wave transmissivity.

Therefore, the present invention may be extensively applied to civil use, nuclear industry, aerospace, military affairs and national defense. The resultant boron carbide high polymeric fiber fills in a gap of the same class of products in China.

The material is recyclable and pollution-free.

DETAILED DESCRIPTION OF PREFERRED EMBODIMENTS

The present invention provides a novel material boron carbide high polymeric fiber fabricated from the following parts of raw materials by weight:
50-60 parts of boron carbide,
150-193 parts of high polymeric ethylene emulsion with a mass concentration 40%-50%,
116 parts of hydrochloric acid with a mass concentration 37%,
3-5 parts of antioxidant, and
7 parts of catalyst.

The boron carbide is one boron carbide selected from a group consisting of w14, w20, w28 and w40;

The high polymeric ethylene emulsion is selected from polyethylene emulsion HA-soft80, GFN and 85-CDIT;

The antioxidant is any one selected from compounds among antioxidants such as diphenylamine, p-diphenylamine and dihydroquinoline, and derivatives or polymers thereof.

The catalyst is one selected from trifluoromethanesulfonic anhydrides as catalysts.

The present invention further provides a method of fabricating a novel material boron carbide high polymeric fiber from the above parts of raw materials by weight, comprising the following steps:

(1) immersing boron carbide in hydrochloric acid for 90-120 minutes to remove impurities;

(2) placing the cleaned and dried boron carbide in a 2600° C. high-temperature high-pressure furnace for melting; placing the resultant molten boron carbide in a high temperature-resistant spinning furnace to produce boron carbide precursors;

(3) adding a catalyst in a high polymeric ethylene emulsion containing an antioxidant, placing the boron carbide precursors therein, and producing inorganic high molecular polymer, namely, a preliminary product of boron carbide high polymeric fiber, under 15-30 atmospheric pressures. The preliminary product is subjected to surface treatment through calcium hydroxide solution, and then cleaned and dried to finally obtain the boron carbide high polymeric fiber according to the present invention.

What is claimed is:

1. A boron carbide high polymeric fiber comprising the following raw materials: boron carbide, high polymeric ethylene emulsion, hydrochloric acid, antioxidant and catalyst.

2. The boron carbide high polymeric fiber according to claim 1, fabricated from the following parts of raw materials by weight:
50-60 parts of boron carbide,
150-193 parts of high polymeric ethylene emulsion with a concentration 40%-50%,
116 parts of hydrochloric acid with a concentration 37%,
3-5 parts of antioxidant, and
7 parts of catalyst.

3. The boron carbide high polymeric fiber according to claim 1, wherein the boron carbide is one boron carbide selected from a group consisting of w14, w20, w28 and w40.

4. The boron carbide high polymeric fiber according to claim 1, wherein the high polymeric ethylene emulsion is selected from polyethylene emulsion HA-soft80, GFN and 85-CDIT.

5. The boron carbide high polymeric fiber according to claim 1, wherein the antioxidant is any one selected from compounds among antioxidants such as diphenylamine, p-diphenylamine and dihydroquinoline, and derivatives or polymers thereof.

6. The boron carbide high polymeric fiber according to claim 1, wherein the catalyst is one selected from trifluoromethanesulfonic anhydrides as catalysts.

7. A method of fabricating a novel material boron carbide high polymeric fiber of claim 1, comprising the following steps:

(1) immersing boron carbide in hydrochloric acid for 90-120 minutes to remove impurities;

(2) placing the cleaned and dried boron carbide in a 2500-2800° C. high-temperature high-pressure furnace for melting; placing the resultant molten boron carbide in a high temperature-resistant spinning furnace to produce boron carbide precursors;

adding a catalyst in a high polymeric ethylene emulsion containing an antioxidant, placing the boron carbide precursors therein, and producing inorganic high molecular polymer, namely, a preliminary product of boron carbide high polymeric fiber, under 15-30 atmospheric pressures;

the preliminary product is subjected to surface treatment through calcium hydroxide solution, and then cleaned and dried to finally obtain the boron carbide high polymeric fiber.

* * * * *